United States Patent [19]

Lai

[11] Patent Number: 5,406,051
[45] Date of Patent: Apr. 11, 1995

[54] WELDING MACHINE WITH A HIGH FREQUENCY CONVERTER

[75] Inventor: Jih-Sheng Lai, Knoxville, Tenn.

[73] Assignee: Electric Power Research Institute, Palo Alto, Calif.

[21] Appl. No.: 56,298

[22] Filed: Apr. 29, 1993

[51] Int. Cl.[6] ............................................. B23K 9/10
[52] U.S. Cl. .................................. 219/130.1; 363/17
[58] Field of Search ............. 219/130.1, 130.4, 130.31, 219/130.32, 137 PS, 130.51; 363/17

[56] References Cited

U.S. PATENT DOCUMENTS

| | | |
|---|---|---|
| 4,520,255 | 5/1985 | Bredenkamp et al. . |
| 4,521,672 | 6/1985 | Fronius .................. 219/130.51 |
| 4,621,312 | 11/1986 | Yuzurihara et al. . |
| 4,672,528 | 6/1987 | Park et al. . |
| 4,794,506 | 12/1988 | Hino et al. . |
| 4,855,888 | 8/1989 | Henze et al. . |
| 4,860,189 | 8/1989 | Hitchcock . |
| 4,864,479 | 9/1989 | Steigerwald et al. . |
| 4,901,216 | 2/1990 | Small . |
| 4,912,622 | 3/1990 | Steigerwald et al. . |
| 4,916,599 | 4/1990 | Traxler et al. ............. 219/130.33 |
| 4,953,068 | 8/1990 | Henze . |
| 5,017,757 | 5/1991 | Kawai et al. ............... 219/137 PS |
| 5,132,888 | 7/1992 | Lo et al. . |
| 5,132,889 | 7/1992 | Hitchcock et al. . |
| 5,134,307 | 7/1992 | Nakano . |
| 5,157,592 | 10/1992 | Walters . |
| 5,157,593 | 10/1992 | Jain . |

FOREIGN PATENT DOCUMENTS

| | | | |
|---|---|---|---|
| 58-107265 | 6/1983 | Japan ......................... | 219/130.32 |
| 58-159979 | 9/1983 | Japan ......................... | 219/130.1 |

OTHER PUBLICATIONS

National Electrical Manufacturers Association. *Electric Arc Welding Power Sources.* NEMA Publication No. EW1, (1989) pp. 1-37.

H. B. Cary, *Modern Welding Technology*, (New Jersey, 1989) Chapter 10, pp. 301-339.

F. S. Tsai, "Small-Signal and Transient Analysis of a Zero-Voltage-Switched, Phase-Controlled PWM Converter Using Averaged Switch Model," *Conference Record of IEEE IAS Annual Meeting*, (Michigan, 1991) pp. 1010-1016.

Q. Chen, A. Lofti, and F. C. Lee, "Optimization and Design Issues of Low Output Voltage, Off-Line, Zero-Voltage Switched PWM Converter," *Proceedings of 1992 APEC Conference*, (Massachusetts, 1992) pp. 73-80.

*Primary Examiner*—Clifford C. Shaw
*Attorney, Agent, or Firm*—Flehr, Hohbach, Test, Albritton & Herbert

[57] ABSTRACT

A welding machine includes a power source having a high frequency, zero-voltage switching converter. The preferred power source includes an input rectifier bridge, a zero-voltage switched inverter, a high frequency transformer and an output rectifier. The inverter switches at zero voltage without adding extra inductive or capacitive components, and without increasing voltage or current stresses on the welding machine architecture. A controller operates converter switching devices to turn on at zero voltage. This system avoids switching losses and drastically increases the switching frequency to avoid audible switching noise levels. Advantageously, passive components are reduced in size to yield a more compact welding machine, which is capable of more uniform welding than earlier designs.

4 Claims, 6 Drawing Sheets

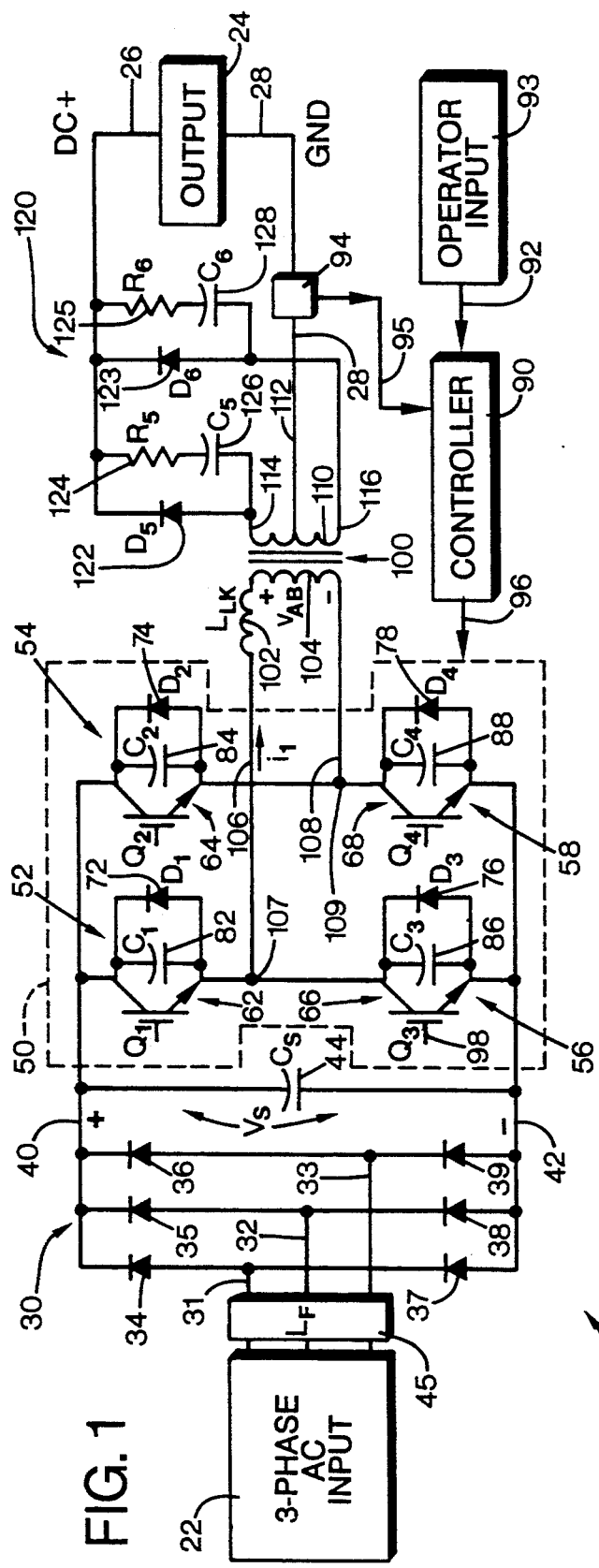
FIG. 1
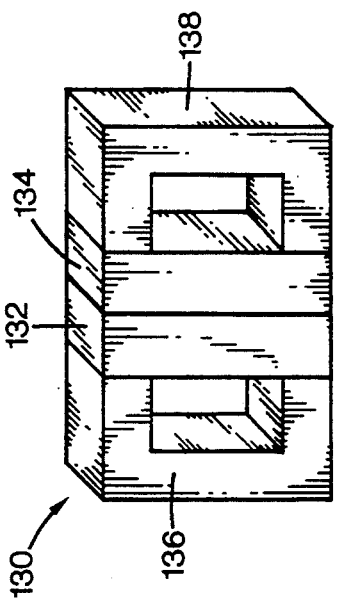
FIG. 5
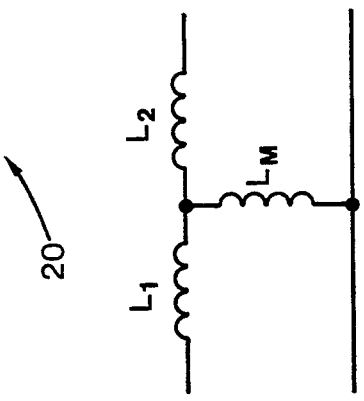
FIG. 6
FIG. 3

WELDING MACHINE WITH A HIGH FREQUENCY CONVERTER

BACKGROUND OF THE INVENTION

The present invention relates generally to a power source for a welding machine and a method of controlling such a source, and more particularly to a welding machine power source having a high frequency zero-voltage switching converter. The disclosed power source may be used for high power welding applications, such as gas tungsten arc welding, gas metal arc welding, microjoining spot welding, seam welding, high frequency tube welding, and plasma cutting.

In the past, welding machine power sources were either of the rotating machine variety, or static converter based devices. The majority of the earlier welding machines used various static converter configurations, in conjunction with a transformer, for providing the desired voltage and current levels at the welding electrodes.

FIGS. 12 and 13 illustrate two typical earlier welding machine power sources. FIG. 12 is a schematic block diagram of a static converter based source having thyristor phase control. FIG. 13 is a schematic block diagram of a traditional inverter based welding machine power source. The controllers for generating gate signals, as well as the operator inputs, have been omitted for clarity from FIGS. 12 and 13.

Referring to FIG. 12, this traditional converter based source receives power from a three phase alternating current (AC) input. A low frequency transformer (i.e. at line frequency such as 60 Hz in the United States) is used to lower the incoming voltage level. A thyristor bridge receives this lower voltage power, and through phase-angle control, regulates the direct current (DC) output voltage or current. A choke inductor is also required at the output. These welding power sources were mainly controlled by thyristor conduction angle, as described in *Electric Arc Welding Power Sources*, National Electrical Manufacturers Association, Publication No. EW1, 1989. Unfortunately, these traditional static converter sources are large and heavy, have low efficiencies, slow output control responses, and high audible noise levels.

More recently, inverter-based power sources gradually replaced the traditional thyristor-controlled power sources, as discussed by H.B. Cary, in *Modern Welding Technology* (Prentice Hall, N.J., 1989). The inverter-based sources were physically smaller and lighter in weight than the static converter configurations. Referring to FIG. 13, a typical switch mode inverter-based source has a bridge for rectifying a three phase AC input power into a DC power. A storage capacitor $C_S$ smooths out the DC bus voltage between the rectifier bridge and an inverter bridge, which converts the DC bus voltage into a square wave AC voltage.

Typically, the inverter bridge is controlled using a pulse-width-modulation (PWM) scheme to regulate the output voltage and current. The inverter bridge output is supplied to a high frequency transformer. The ends of the transformer secondary winding are coupled through a pair of output diodes and a choke inductor to the positive electrode. A center tap of the secondary winding is coupled to the ground electrode of the welding machine.

These ordinary full-bridge inverters have two switch-pairs which turn on and off alternately to generate a square wave output. Each switch-pair contains two switching devices which turn on and off simultaneously. These simultaneous switching schemes generate high switching losses and high device switching stresses. Moreover, these earlier sources generate troublesome electromagnetic interference (EMI).

The basic idea of operating a full-bridge converter at zero-voltage crossings is described in U.S. Pat. No. 4,864,479 to Stiegerwald et al. However, Stiegerwald et al. use a DC-to-DC power supply which requires an output filter capacitor for voltage regulation. Various design considerations and a mathematical model for the Stiegerwald et al. circuit are presented in two papers. The first paper is by F.S. Tsai, and entitled "Small-Signal and Transient Analysis of a Zero-Voltage-Switched, Phase-Controlled PWM Converter Using Averaged Switch Model," *Conference Record of IEEE IAS Annual Meeting*, Detroit Mich. Oct. 1991, pp. 1010–1016. The second paper, by Q. Chen et al., is entitled "Optimization and Design Issues of Low Output Voltage, Off-Line, Zero-Voltage Switched PWM Converter," *Proceedings of* 1992 APEC Conference, Boston, Mass., Feb. 1992, pp. 73–80.

Thus, a need exists for an improved welding machine power source and an improved method of controlling such a power source, which is directed toward overcoming, and not susceptible to, the above limitations and disadvantages.

SUMMARY OF THE INVENTION

The present invention overcomes a variety of drawbacks suffered by earlier welding machine power sources, such as large size and weight, low efficiency, slow output control response, high noise levels, high switching losses, high device switching stresses, and electromagnetic interference (EMI) problems. To accomplish these goals, the illustrated embodiment of the present invention employs a high frequency, zero-voltage switching scheme which operates converter switching devices to turn on at zero voltage. The resulting power source is more compact, quieter, and provides more uniform welding for a wider range of applications than earlier systems.

According to one aspect of the present invention, a welding machine power source includes a rectifier input bridge for coupling to an AC source. The source also has an inverter coupled to the input bridge. The inverter has four switch assemblies, with each switch assembly comprising an antiparallel coupled switch and diode, and having a parasitic capacitance. Each switch is responsive to a gate signal. The source also has a high frequency transformer coupled to the inverter. The transformer has a leakage reactance selected to resonate with the parasitic capacitance for generating a period of zero voltage across each switch. An output rectifier is coupled to the transformer for powering a welding electrode. The source also has a controller for generating the gate signals during the zero voltage periods.

According to other aspects of the present invention, methods are provided for controlling a welding machine power source and for powering a welding machine.

An overall object of the present invention is to provide a welding machine power source with lower losses and a wider range of applications than earlier welding machines.

A further object of the present invention is to provide a welding machine power source which is lightweight, compact, quieter, and more efficient than earlier welding machines.

An additional object of the present invention to provide a welding machine power source which provides faster and more uniform welding to more rapidly produce a higher quality work product than the earlier welding machines.

Another object of the present invention is to provide methods for controlling a welding machine power source, and for powering a welding machine, with higher efficiency than the earlier welding methods.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 1 is a schematic block diagram of one form of a welding machine power source of the present invention.

FIG. 3 is a schematic diagram of an equivalent circuit for the transformer of FIG. 1.

FIGS. 5 and 6 are perspective views of one form of the ferrite-based high frequency transformer of FIG. 1, with FIG. 5 showing the ferrite core, and FIG. 6 showing the coils.

DETAILED DESCRIPTION OF A PREFERRED EMBODIMENT

Figure 2:
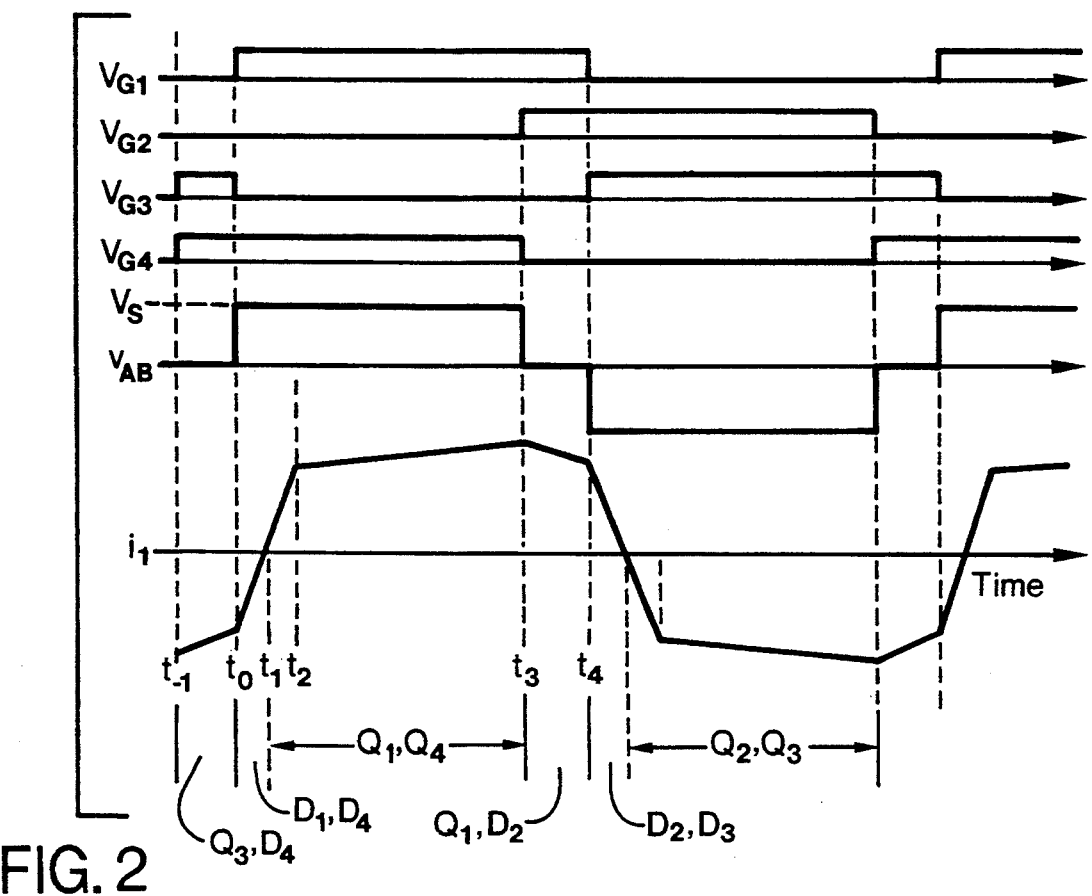
FIG. 2 is a graph illustrating one manner of controlling the welding source of FIG. 1 using zero-voltage switching under loaded conditions.

FIG. 1 illustrates an embodiment of a welding machine power source 20 constructed in accordance with the present invention. The welding source 20 preferably receives power from a three phase AC input 22, and converts this input as described further below for supply to a welding electrode output 24. It is apparent that the welding source 20 may also be modified to receive power from other inputs, such as a single phase AC input. The output 24 includes two electrodes (not shown), one a positive direct current (DC+) electrode coupled to conductor 26, and the other a ground (GND) electrode coupled to conductor 28.

The welding source 20 includes an input rectifier bridge 30 which receives three phase (a, b, c) power from the AC input 22 via conductors 31, 32 and 33. The input bridge 30 has three positive diodes 34, 35, 36, and three negative diodes 37, 38, 39, each coupled to the respective input conductors 31, 32, 33. The positive diodes 34–36 are coupled to a positive DC bus 40, and the negative diodes 37–39 are coupled to a negative DC bus 42.

The welding source 20 may include an input filtering device, such as a $C_S$ storage capacitor 44 coupled in parallel with the output of bridge 30, between the positive and negative DC buses 40, 42. The DC bus voltage between buses 40 and 42 is shown across the capacitor 44 as a source voltage $V_S$. The $C_S$ capacitor 44 provides capacitor filtering to smooth the DC bus voltage and substantially eliminate ripple generated by the rectifier bridge 30. Alternatively, the input filtering function may be provided by filter inductors, illustrated as an $L_F$ filtering device or filter 45, coupled in a conventional manner between the AC input 22 and the incoming conductors 31, 32 and 33. Other structurally equivalent input filtering devices may be substituted for capacitor 44 and/or the filter inductors 45, as known to those skilled in the art.

The illustrated welding source 20 also has a converter, such as an insulated gate bipolar transistor (IGBT) based inverter 50, coupled to the positive and negative DC buses 40, 42. The inverter 50 includes four switch assemblies 52, 54, 56 and 58. In the illustrated embodiment, each of the four switch assemblies 52–58 includes a controlled switching device or switch, such as $Q_1$, $Q_2$, $Q_3$ and $Q_4$ insulated gate bipolar transistors (IGBTs) 62, 64, 66 and 68. Each switch assembly 52–58 also includes $D_1$, $D_2$, $D_3$ and $D_4$ diodes 72, 74, 76 and 78, which are coupled in an antiparallel relationship with the switches 62, 64, 66 and 68, respectively. In the schematic diagram of FIG. 1, the internal stray or parasitic capacitances of the switch assemblies 52–58 are schematically illustrated as $C_1$, $C_2$, $C_3$ and $C_4$ capacitors 82, 84, 86 and 88, respectively.

It is apparent to those skilled in the art that other structurally equivalent switches may be substituted for switches 62–68, such as metal oxide field effect transistors (MOSFETs), gate turnoff thyristors (GTOs), and the like. In the illustrated embodiment, IGBTs are preferred for their high speed, which allows to operate at frequencies of 50 kHz or higher. As discussed further below, in a 30 kW prototype unit, constructed in accordance with the present invention, IGBTs were selected because they are more cost effective at such a high power level (30 kW).

The welding source 20 includes a controller 90, which receives an operator input signal 92 from an operator input device 93. The operator input device 93 may set various desired welding parameters, such as welding amperage and voltage levels, which may vary depending upon the type of materials being welded, the material thickness, the type of weldment used, etc. To control the output welding current levels, an output sensor device may be used, such as a conventional current sensing monitor and feedback circuit 94 which generates a current sensor signal 95 in response to current flowing through the electrodes. In the illustrated embodiment, the current sensor 94 is shown monitoring the current flowing through the ground conductor 28.

In response to the operator input and current sensor signals 92 and 95, the controller 90 provides a composite gate signal 96 which controls when the $Q_1$–$Q_4$ switches 62–68 conduct. For example, the $Q_3$ switch 66 has a gate conductor 98 which receives a portion of gate signal 96. When the gate signal is at a high level, switch 66 conducts, and when the gate signal is at a low level, the switch 66 stops conducting. As used herein, the term "turn on" refers to a switch entering a conducting state, whereas the term "turn off" refers to a switch entering a nonconducting state.

The welding source 20 has a high frequency transformer 100 with a selected internal inductance. One portion of this internal inductance is schematically illustrated in FIG. 1 an $L_{LK}$ leakage reactance 102 in series with a primary winding 104 of transformer 100. One end of the primary winding 104 is coupled by conductor 106 to a junction point 107 between the $Q_1$ and $Q_3$ switches 62 and 66. The other end of the primary winding 104 is coupled by conductor 108 to a junction point 109 between the $Q_2$ and $Q_4$ switches 64 and 68. The illustrated transformer 100 has a secondary winding 110 with a center tap 112. The secondary winding includes a first end 114, and a second end 116, with the center tap 112 therebetween.

An output rectifier 120 couples the transformer secondary winding 110 to the positive electrode conductor 26, while the center tap 112 is coupled to the ground conductor 28. Advantageously, the use of transformer 100 with center tap 112 provides a reduction in the number of output rectifier legs over that required with earlier devices. The first end 114 of the secondary winding is coupled to a $D_5$ diode 122, and the second end 116 is coupled to a $D_6$ diode 123 of rectifier 120. Preferably, the $D_5$ and $D_6$ diodes 122 and 123 are Schottky diodes, which advantageously provide a low forward voltage drop, and a fast recovery. The illustrated rectifier 120 produces a substantially ripple-free DC voltage, which provides a smoother waveform to the output 24 to avoid welding ripple.

To reduce the turn-off transients induced in the output by the diodes 122 and 123, and to reduce an undesirable parasitic ringing phenomenon, discussed further below, the rectifier 120 may include a snubber circuit. Either polarized or nonpolarized snubber circuits may be used. The illustrated rectifier 120 has a nonpolarized snubber configuration, with two $R_5$ and $R_6$ snubber resistors 124 and 125 in series with two $C_5$ and $C_6$ snubber capacitors 126 and 128, respectively. In the first snubber circuit, the $R_5$ resistor 124 and the $C_5$ capacitor 126 are in parallel with the $D_5$ Schottky diode 122. Similarly, the second snubber circuit has the $R_6$ resistor 125 and the $C_6$ capacitor 128 coupled in parallel with the $D_6$ Schottky diode 123.

Advantageously, zero voltage can be obtained across the $Q_1$–$Q_4$ switches 62–68 by selecting the switch assemblies 52–58 and the transformer 100 so a resonance condition exists between the $L_{LK}$ transformer leakage inductance 102 and the $C_1$–$C_4$ stray capacitances 82–88. By selecting the welding source components in this manner, no additional inductive or capacitive (LC) components are required for resonance. As described further below, the gate signals 96 are arranged by controller 90 to have a phase difference between two diagonal switches, that is between the $Q_1$ and $Q_4$ switches 62 and 68, and between the $Q_2$ and $Q_3$ switches 64 and 66. This control scheme provides the transformer primary winding 104 with a $v_{AB}$ quasi-square wave voltage input.

Prototype

A 30 kW prototype welding power source was constructed according to the illustrated preferred embodiment of source 20. This prototype used IGBT-based switching assemblies 52–58 because the IGBTs are capable of operating at frequencies higher than 50 kHz (kilohertz). IGBTs were also more cost effective than other types of switches at the 30 kW power level. In the prototype, it was found that the welding conductors 26 and 28 advantageously provided an $L_O$ inductance (not shown) which was sufficient to filter the welding current provided by rectifier 120. The $L_O$ output filtering inductance of conductors 26 and 28 also served to smooth welding spots by providing a more uniform DC current to the welding electrodes, and thus, to the work piece being welded.

In operation, the welding machine is operated under two conditions, either fully loaded or at no load. Under fully loaded conditions, the two electrodes coupled to conductors 26 and 28 are shorted together by an arc between these electrodes. Under no load conditions, the two electrodes of output 24 form an open circuit. Both of these two operating conditions are described in detail below with respect to FIG. 1.

Loaded Condition Operation

Referring to FIG. 2, under loaded conditions, the operation of the welding source 20 is divided into three basic modes of operation in a half cycle, or six modes in a complete cycle. The graph of FIG. 2 shows the gate signals 96 applied to the switches 62–68, and the $V_{AB}$ primary voltage and $i_1$ primary current of transformer 100. Specifically, the composite gate signal 96 includes $V_{G1}$, $V_{G2}$, $V_{G3}$ and $V_{G4}$ signals applied to the gate conductors 98 of the respective switches 62, 64, 66 and 68. The three basic modes of operation, with respect to the first half cycle shown in FIG. 2, are described below as Mode 1, which occurs between $t_0$ and $t_2$; Mode 2, which occurs between times $t_2$ and $t_3$; and Mode 3, which occurs between times $t_3$ and $t_4$.

1. Mode 1 ($t_0$–$t_2$)

Referring to FIG. 2, at a time before $t_0$, indicated as time $t_1$, the $V_{G4}$ signal goes to a high level, while the $D_4$ diode 78 is conducting to advantageously provide zero-voltage turn on of the $Q_4$ switch 68. Initially at time $t_0$, the $Q_3$ switch 66 receives a $V_{G3}$ gate signal instructing switch 66 to turn off. At time $t_0$, when the $Q_3$ switch 66 turns off, the primary transformer current $i_1$ charges the $C_3$ capacitor 86, and discharges the $C_1$ capacitor 82 until the voltage across the $Q_3$ switch 66 equals the $V_S$ supply voltage, and the voltage across the $Q_1$ switch 62 equals zero. At this instant, when the voltage across $Q_1$ reaches zero, the $D_1$ diode 72 begins to conduct, allowing the $i_1$ transformer primary current to flow through the $D_4$ and $D_1$ diodes 78 and 72. The $V_{G1}$ gate signal is set to a high level at time $t_0$ while the $D_1$ diode 72 is conducting, and in response the $Q_1$ switch 62 turns on, advantageously, at zero-voltage.

For practical, non-ideal switches, there must be a dead time or time lapse between when the $V_{G3}$ gate signal goes to a low value (to turn off switch 66), and when the $V_{G1}$ gate signal goes to a high level (to turn on the $Q_1$ switch 62). However, for the purposes of discussion, this switching is illustrated as occurring at the same time (at $t_0$).

At time $t_1$, the primary current $i_1$ changes polarity and is diverted to flow through the now conducting diagonal $Q_1$ and $Q_4$ switches 62 and 68. This rate of current rise remains constant from $t_1$ through time $t_2$. During the entire period of Mode 1 ($t_0$ to $t_2$), the transformer secondary current is freewheeling through the $D_6$ diode 123, the snubber filter, and the electrodes of output 24. Thus, during Mode 1, the excitation branch of transformer 100 is effectively shorted. The rise rate of the $i_1$ primary current may be expressed according to equation (1), neglecting the resistance drop of the primary winding 104, as:

$$\frac{di_1}{dt} = \frac{V_S}{L_{LK}} \qquad (1)$$

2. Mode 2 ($t_2$–$t_3$)

At time $t_2$, the $i_1$ primary current rises to a value of $i_L/n$ (where $i_L$ is the load current, and "n" is the turns ratio of the transformer 100), or until the transformer induced voltage is greater than the DC bus source voltage $V_S$ across capacitor 44. The $L_{LK}$ transformer leakage inductance 102 is equivalently in series with the $L_O$ output filtering inductance provided by conductors 26 and 28. The rise rate of the primary current $i_1$ is slowed down due to this additional $L_O$ inductance of conductors 26 and 28. Equation (2) expresses the state equation of Mode 2, in which the equivalent resistance $R_{EQ}$ includes the resistance of output cables 26 and 28, and both the primary and secondary transformer windings 104 and 110:

$$\frac{di_1}{dt} = \frac{V_S - i_1 R_{EQ}}{L_{LK} + n^2 L_F} \qquad (2)$$

3. Mode 3 ($t_3$–$t_4$)

At time $t_3$, the $V_{G4}$ gate signal drops, and in response, the $Q_4$ switch 68 turns off. The $i_1$ primary current then charges and discharges through the $C_4$ and $C_2$ capacitances 88 and 84 until the voltage across the $Q_4$ switch 68 equals the DC bus voltage $V_S$ and the voltage across the $Q_2$ switch 64 equals zero. At time $t_3$, the $D_2$ diode 74 starts conducting, and at that instant, begins diverting the current from the $Q_4$ switch 68. The $i_1$ primary current flows in a free wheeling path through the $Q_1$ switch 62 and the $D_2$ diode 74. The current decreasing rate between times $t_3$ and $t_4$ is shown in equation (3) as:

$$\frac{di_1}{dt} = \frac{0 - i_1 R_{EQ}}{L_{LK} + n^2 L_F} \qquad (3)$$

It is apparent that a similar process is repeated with opposite voltage and current directions in the remaining half cycle after $t_4$. FIG. 2 shows the time during which the diagonally opposing $D_2$ and $D_3$ diodes 74 and 76 conduct, and the time during which the diagonally opposing $Q_2$ and $Q_3$ switches 64 and 66 conduct. After this time, the next cycle begins, as described above.

No-Load Condition Operation

A typical transformer equivalent circuit is shown in FIG. 3, where $L_1$ and $L_2$ are the leakage inductances of the respective primary and secondary windings. The other portion of the selected internal inductance of the high frequency transformer 100, other than the $L_{LK}$ leakage reactance 102, is schematically illustrated in FIG. 3 as a magnetizing inductance $L_M$. In FIG. 1, the $L_{LK}$ leakage inductance 102 is the sum of $L_1$ and $L_2$ or $L_{LK} = L_1 + n^2 L_2$, where "n" is the turns ratio of transformer 100. Under the no-load condition when welding has ceased, the transformer secondary 110 is always open circuited, and the operating characteristic of inverter 50 is dominated by the transformer magnetizing inductance $L_M$.

Figure 4:
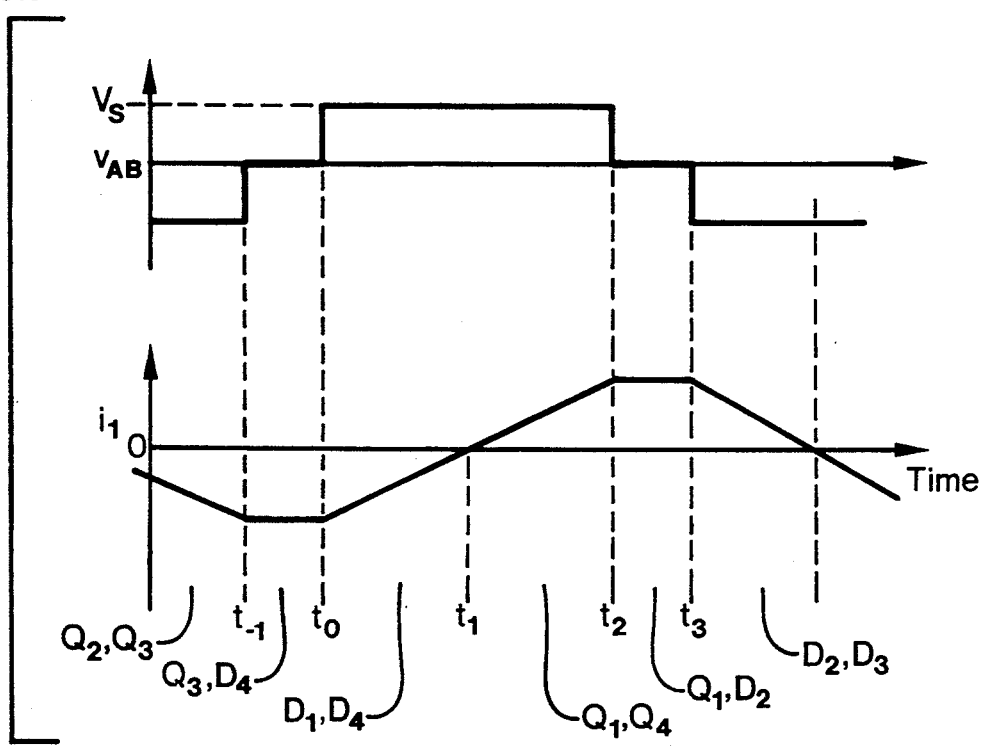
FIG. 4 is a graph illustrating one manner of operating the welding source of FIG. 1 under no-load conditions.

The no-load operation of inverter 50 may be divided into two basic modes in a half cycle, or four modes in a complete cycle. FIG. 4 illustrated operation of the welding source 20 under the no-load condition. The $V_{G1}$, $V_{G2}$, $V_{G3}$ and $V_{G4}$ gate signal sequence is the same as that in FIG. 2; however, the rate of $i_1$ current change is different because of the different load characteristic. The two basic operation modes are described below.

1. Mode 1 ($t_0$–$t_2$)

Referring to FIG. 4, at a time before $t_0$, indicated as time $t_1$, the $V_{G4}$ signal goes to a high level, while the $D_4$ diode 78 is conducting to advantageously provide zero-voltage turn on of the $Q_4$ switch 68. At the time $t_0$, the $V_{G3}$ signal drops, and in response, the $Q_3$ switch 66 turns off. This forms a resonant tank comprising the $L_M$ transformer magnetizing inductance (instead of the $L_{LK}$ leakage inductance) and the $C_1$ and $C_3$ device internal capacitances 82 and 86. The $i_1$ primary current charges through $C_3$ and discharges through $C_1$ until the voltage across the $Q_3$ switch 66 equals the supply voltage $V_S$ and the voltage across the $Q_1$ switch 62 equals zero. At this instant, shortly after $t_0$ when the voltage across $Q_1$ reaches zero, the $D_1$ diode 72 conducts, and $i_1$ primary current freewheels through $D_1$ and $D_4$ diodes 72 and 78. The DC bus voltage $V_S$, is directly applied to the transformer primary 104, and gives an increasing current rate, shown as the slope from $t_0$ to $t_1$ in FIG. 1, and as defined in equation (4):

$$\frac{di_1}{dt} = \frac{V_S}{L_1 + L_M} \qquad (4)$$

At time $t_1$, the $i_1$ primary current changes polarity and is diverted to the now conducting diagonal $Q_1$ and $Q_4$ switches 62 and 68. The current rise rate of equation (4) continues until the $Q_4$ switch 68 is turned off by the $V_{G4}$ gate signal dropping to a low value, as instructed by controller 90.

2. Mode 2 ($t_2$–$t_3$)

At time $t_2$, the $Q_4$ switch 68 turns off, but the $Q_1$ switch 62 remains on. The voltage at junction point 109, between switches 64 and 68, starts increasing due to the resonance between the transformer magnetizing inductance $L_M$ and the $C_2$ and $C_4$ parasitic capacitances 84 and 88. The $i_1$ primary current starts flowing through the $D_2$ diode 74 when the voltage at point 109 is greater than the DC bus voltage $V_S$. During Mode 2, there is no voltage applied to the transformer 100, and $i_1$ primary current remains unchanged until the $Q_1$ switch 62 turns off at time $t_3$. The state equation during Mode 2 may be represented by equation (5):

$$\frac{di_1}{dt} = 0 \qquad (5)$$

It is apparent that a similar process is repeated with opposite voltage and current directions in the remaining half cycle after $t_3$. FIG. 4 shows the time during which the diagonally opposing $D_2$ and $D_3$ diodes 74 and 76 conduct, the time during which the diagonally opposing $Q_2$ and $Q_3$ switches 64 and 66 conduct, and the time during which the diagonally opposing $Q_3$ switch 66 and the $D_4$ diode 78 conduct. After this time, the next cycle begins, as described above.

Performance of a High Frequency Transformer

The high-power high-frequency design of transformer 100 provides significant advantages to the welding power source 20. FIGS. 5 and 6 show a preferred structure for the high frequency transformer 100. Referring to FIG. 5, transformer core 130 has a magnetic path preferably comprising two pairs of U-I ferrite cores, such as the adjacent I-shaped core segments 132 and 134, and the U-shaped core segments 136 and 138.

As illustrated in FIG. 6, the coil 140 maybe constructed using conventional litz wires in a pancake-type structure. This construction is preferred because the thin, individually insulated wires of the litz wire strands advantageously avoid the undesirable high frequency skin effect. The primary winding 104 may be divided by conventional means into two or more segments. In the prototype, the primary winding was divided into two segments for coupling in parallel to accommodate a 300 V peak input voltage $v_{AB}$, or in series for a 600 V peak input voltage $v_{AB}$. As mentioned above, the secondary winding 110 contains the center tap 112 to advantageously allow full-wave rectification.

The prototype transformer has total weight of 8 lbs. The total transformer loss was estimated at 90 W, which includes core loss 60 W and copper loss 30 W. The efficiency is calculated as 99.7%. Tables 1 and 2 list the physical and electrical specifications of the 30 kVA prototype transformer.

TABLE 1

Physical Specification of a 30 kVA Rich Frequency Transformer

| Description | Weight lbs. | % |
| --- | --- | --- |
| Magnetic Core | 3.58 | 43.5 |
| Coils & Bus Bar | 3.25 | 39.5 |
| Structural Assembly | 0.32 | 3.9 |
| Insulators | 0.43 | 5.2 |
| Mechanical Fasteners | 0.65 | 7.9 |
| Total Weight | 8.23 | 100 |
| Specific Weight | 0.27 lbs/kva | |
| Specific Power | 3.6 kva/lb | |

TABLE 2

Electrical Specification of a Rich Frequency Transformer

| Description | Input | Output |
| --- | --- | --- |
| Power | 30.09 kW | 30 kW |
| Voltage | 300/600 V | 50 V |
| Current | 100/50 A | 600 A |
| Efficiency | 99.7% | |

No-Load Test Results

Figure 7:
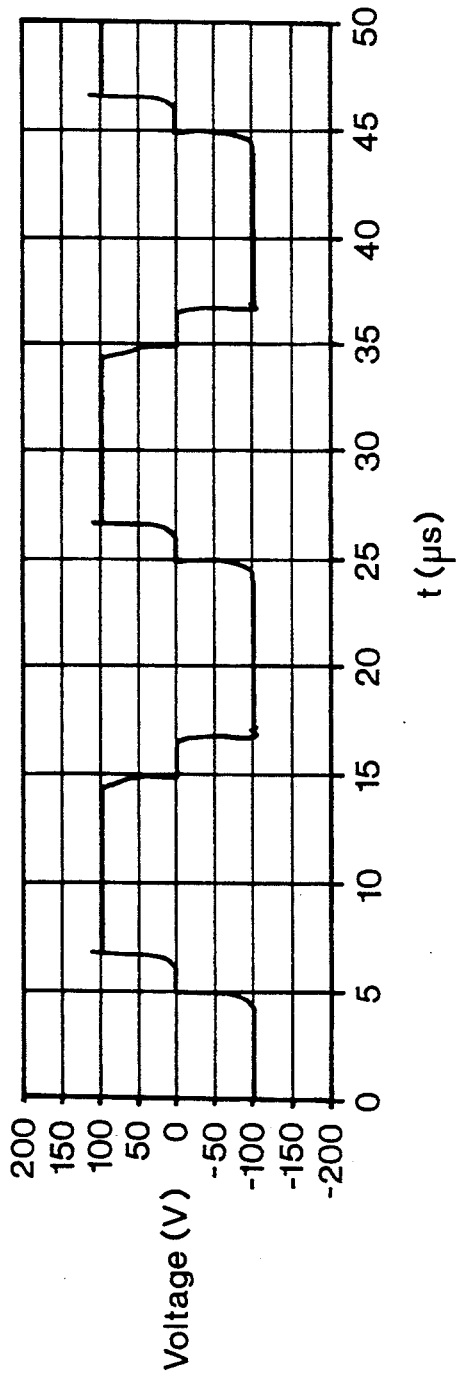
FIGS. 7 and 8 are graphs of the respective voltage and current waveforms for the transformer of FIG. 1 under no-load conditions.
Figure 8:
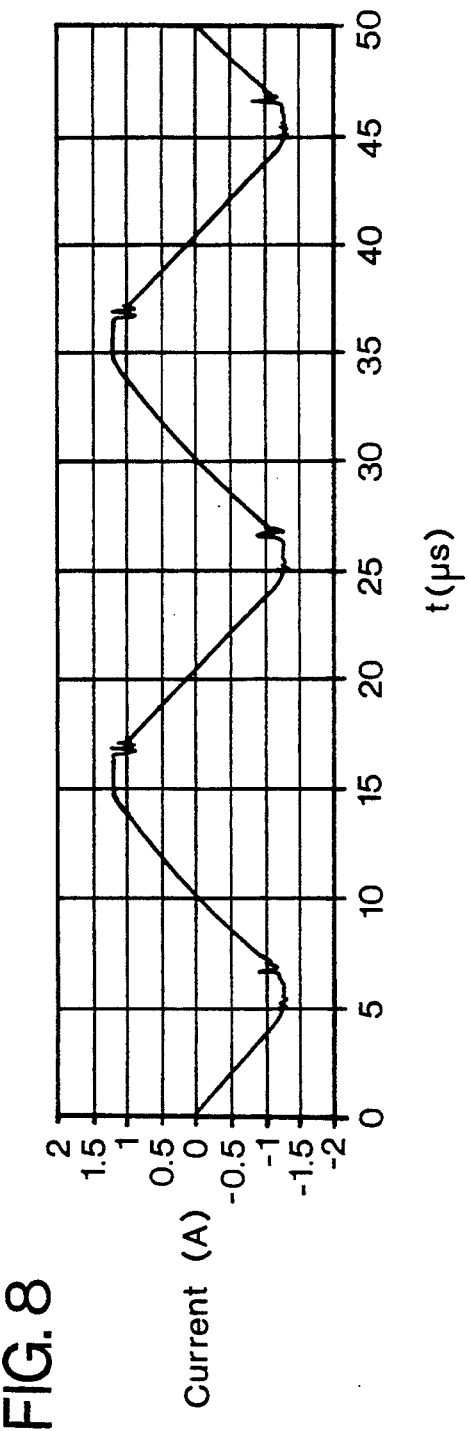

To verify the transformer design parameters of the prototype, a no-load test was conducted using a converter constructed as shown for inverter 50 in FIG. 1. A 50 kHz quasi-square wave was applied to the low voltage side 104 of the transformer. The voltage was increased from 20% to 100%. FIGS. 7 and 8 show the no-load experimental results of the transformer primary voltage $v_{AB}$ and the $i_1$ primary current, respectively.

These voltage and current waveforms were captured by a digital oscilloscope and transmitted to a personal computer. The transformer AC rms voltage, rms current, and average power were then analyzed by a computer program. Both voltage and current waveforms agree well with the analytical waveforms, shown in FIG. 4. The no-load core loss at full voltage was 61.3 W, which is in reasonable agreement with the engineering designed value. The core loss is approximately proportional to the square of the primary voltage $v_{AB}$, and the converter switch loss is linear.

Figure 9:
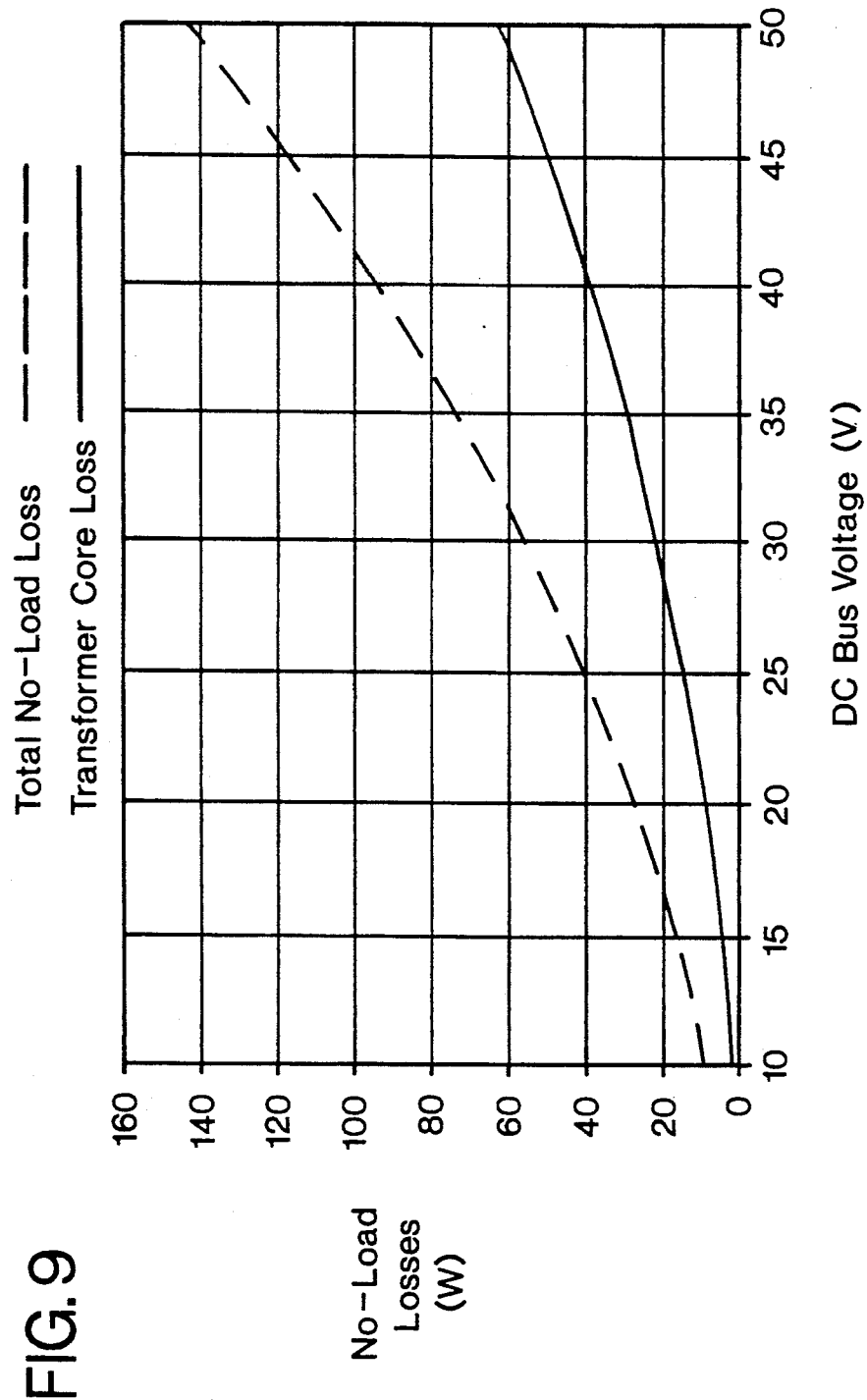
FIG. 9 is a graph of the no-load loss profile for the welding source of FIG. 1, as a function of the DC bus voltage, from a light load to full load.

FIG. 9 shows no-load losses as functions of the DC bus input voltage $V_S$. The no-load losses include the transformer core loss and the switch conduction loss. In this test of the prototype, the inverter output voltage was applied to the secondary winding to determine the transformer no-load parameters.

Load Test Results

Figure 10:
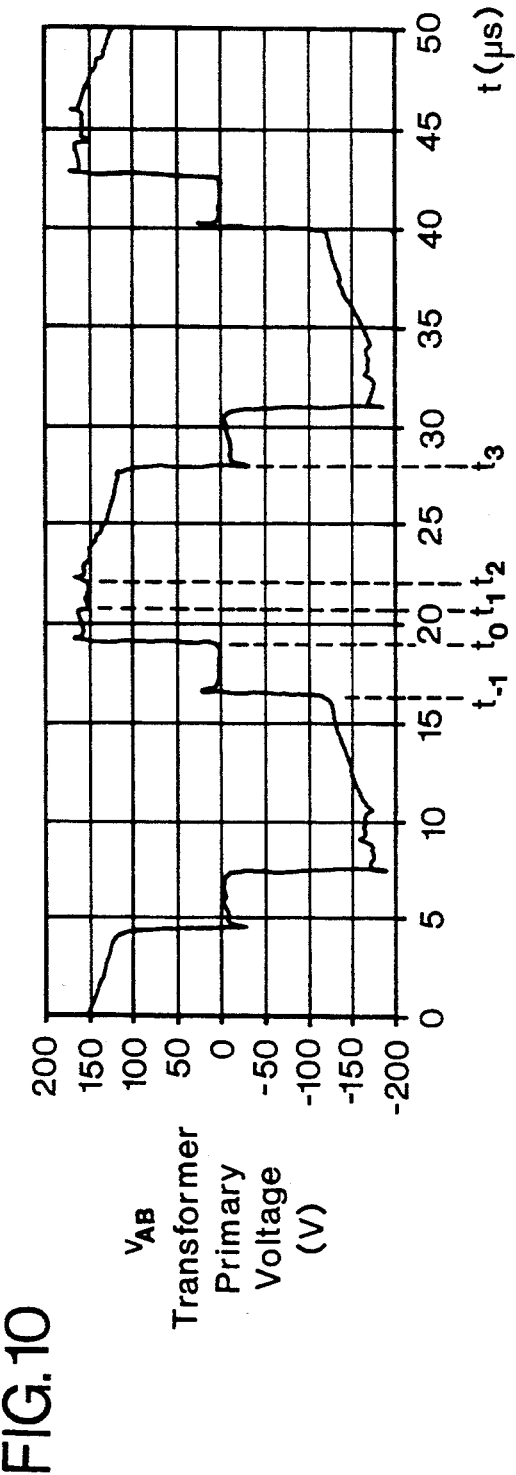
FIGS. 10 and 11 are graphs of the respective primary voltage and primary current for the transformer of FIG. 1, under loaded conditions.
Figure 11:
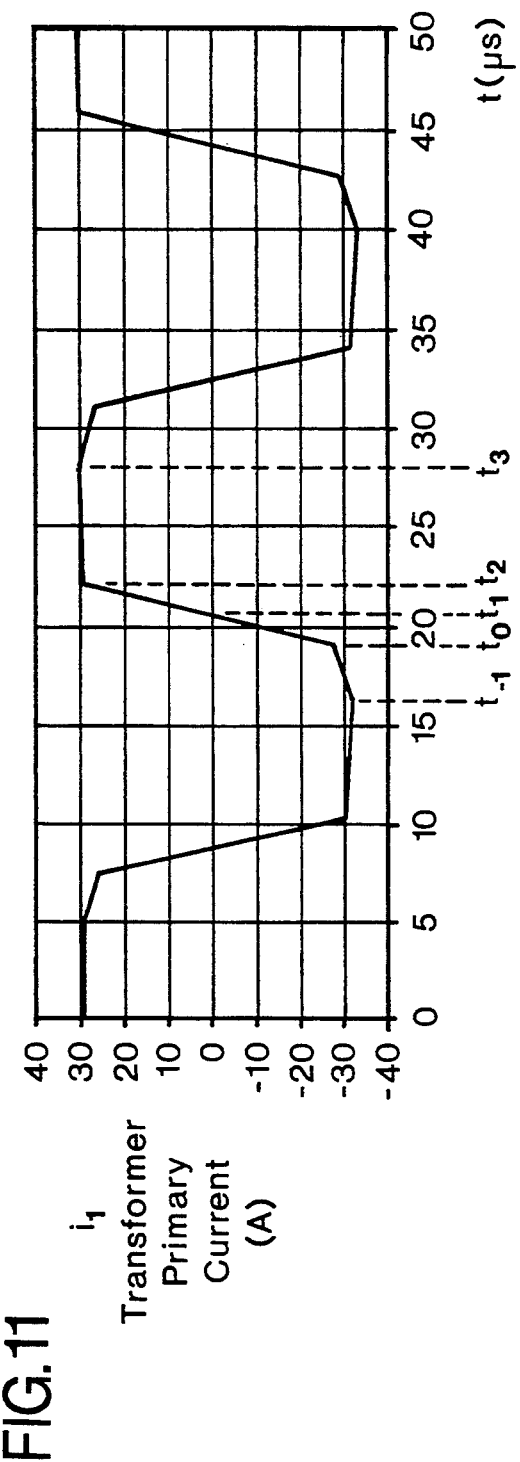
Figure 13:
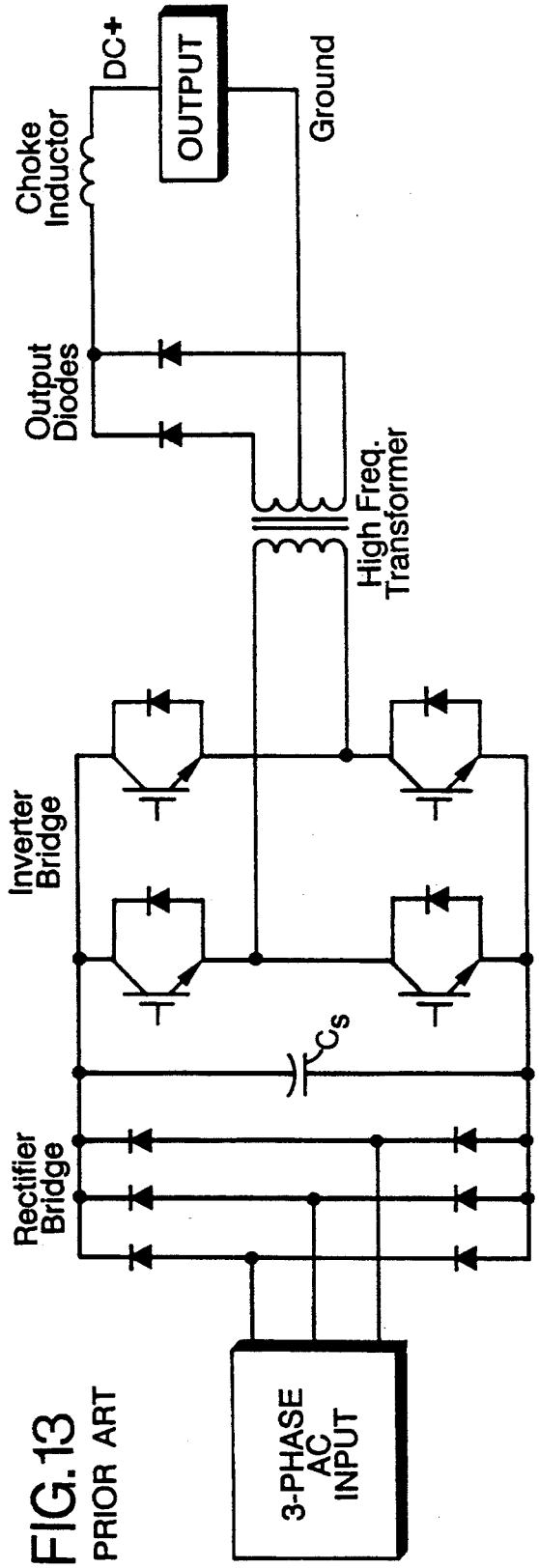
FIG. 13 is a schematic block diagram of an earlier inverter based welding machine power source.
Figure 12:
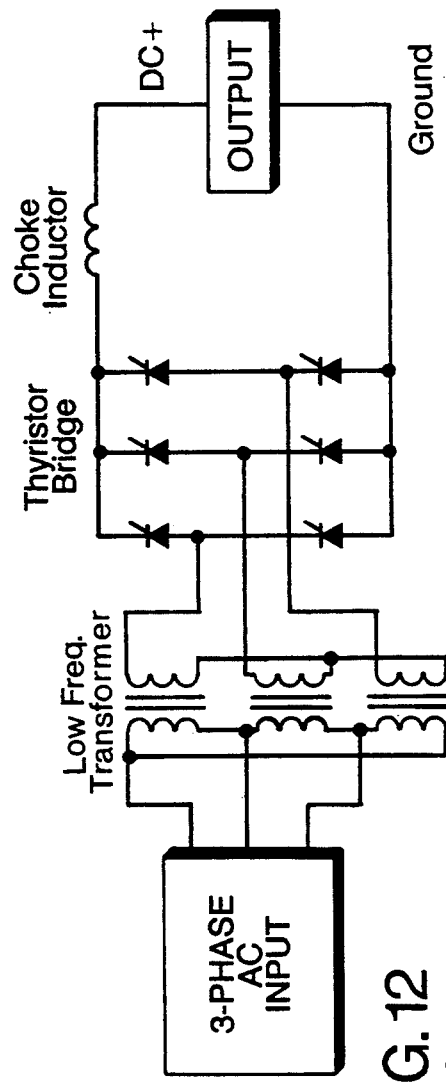
FIG. 12 is a schematic block diagram of an earlier static converter based source having thyristor phase control.

The experimental primary voltage and current waveforms of the prototype under the loaded condition are shown in FIGS. 10 and 11, respectively. In this load test, the AC line was connected to a single-phase 120 V input source 22, and the DC-bus voltage was filtered by an electrolytic capacitor $C_S$ 44 with a 160 V peak voltage. The inverter 50 was controlled a controller 90 having a 100 kHz pulse width modulation, and which produced a 50 kHz AC voltage for the transformer primary $v_{AB}$. The output welding current may be controlled by the current sensing feedback circuit 94 which provided a current sensor signal 95 to controller 90.

Theoretically, the $v_{AB}$ transformer primary voltage should be a quasi-square wave. But because the $C_S$ filter 44 was not optimally sized in this experiment, the DC bus voltage $V_S$ drops when the transformer current builds up, as shown from time $t_2$ to time $t_3$ in FIG. 10. However, a square wave voltage is not absolutely necessary for the welding power source 20 to achieve the desired results. The constant current control scheme using sensor 94 achieved acceptable results, as shown by the graph of the $i_1$ primary current in FIG. 10. The primary current $i_1$ graph of FIG. 11, which is reflected from the output current, presents a near constant top portion, for example, from time $t_2$ to time $t_3$.

Discussion

The illustrated power source 20 is particularly promising in high power welding applications because it achieves zero-voltage switching without adding any resonant LC components, which would detract from efficiency, and without increasing the ratings of the power devices, such as switches 62-68. However, a couple of minor limitations were discovered during testing of the prototype inverter, specifically a reduction of the duty cycle and the secondary parasitic ringing. Schemes for addressing these characteristics are discussed below.

Reduction of Duty Cycle

Referring to FIG. 2, the transformer secondary winding 110 starts conducting until the $i_1$ primary current is higher than the $i_L$ load current, which may be expressed in phasor notation as $I_1 > I_L/n$, where "n" is the turns ratio of transformer 100. This reduced duty cycle period occurs over the entire period of Mode 1 ($t_0$ to $t_2$). This reduced duty cycle period may be derived from FIG. 4, as shown in the following equation (6):

$$\Delta T = t_2 - t_0 = \frac{L_{LK}}{V_S}\left(\frac{2I_L}{n}\right) \quad (6)$$

The maximum effective duty cycle can then be derived as:

$$D_{EFF} = 1 - \frac{t_2 - t_0}{t_4 - t_0} = 1 - \frac{4f_S L_{LK} I_L}{nV_S} \quad (7)$$

where $f_S$ is the inverter switching frequency, or $$f_S = \frac{1}{2(t_4 - t_0)} \quad (8)$$

For the prototype transformer described in Tables 1 and 2, the loss of the duty cycle is about 3 μs, which may be translated into an effective duty cycle 7.0% for 50 kHz operation. From the analysis above, and particularly equation (7), it is apparent that effective duty cycle may be easily increased by reducing either the $L_{LK}$ leakage inductance or the $f_S$ switching frequency.

Transformer Secondary Parasitic Ringing

The $D_5$ and $D_6$ diodes 122 and 123 of the output rectifier 120 may also have a parasitic capacitance $C_R$ (not shown), which may cause an undesirable high frequency ringing from resonance with the transformer leakage inductance 102. Referring to FIG. 2, as the secondary winding begins conducting at time $t_2$, a step voltage is induced. The resonance of the $L_{LK}$ leakage inductance 102 and the $C_R$ rectifier parasitic capacitance may cause an undesirable voltage overshoot across the secondary output. The peak value of this overshoot voltage may be as high as twice the magnitude of the induced step voltage. Any follow-on ringing current would also cause additional heat in the output rectifier diodes 122 and 123. Since the $C_R$ parasitic capacitances of diodes 122 and 123 are effectively in series with the $L_{LK}$ leakage inductance 102, the resonant frequency $f^R$ can be determined according to equation (9):

$$f_R = \frac{1}{2n\pi \sqrt{2L_{LK}C_R}} \quad (9)$$

The test results show a parasitic ringing frequency occurring in the 100 MHz range, without the use of the snubber resistors 124, 125 and capacitors 126, 128. After adding an RC snubber circuit having components 124-128, as shown in FIG. 1, the parasitic ringing was damped. However, the voltage overshoot remained rather high in the prototype unit.

Advantages

The power source 20 is particularly well suited for high power welding applications. Through the use of a high switching frequency, such as over 50 kHz, the welding source 20 may be used for a wide range of different applications. For example, the welding source 20 is well suited for gas tungsten arc welding and gas metal arc welding. For these arc welding applications, the advantages of using the high frequency power conversion of source 20 include more uniform welding in the final work product, a reduction in welder equipment size and weight, and an overall improvement in the system efficiency.

The welding source 20 is also well suited for microjoining spot welding and for seam welding. The high frequency power conversion of source 20 advantageously produces more spots per second, which translates into increased productivity in both spot and seam welding applications.

High frequency tube welding is easily performed using the high frequency source 20. This is believed to be an entirely new application, were use of the high frequency source 20 may be a basic requirement for this type of tube welding.

The welding source 20 may also be used for plasma cutting, which typically requires a higher voltage output than the other applications listed above. Accommodating such a high voltage output is easily accomplished by selecting the transformer 100 with the appropriate turns ratio. Moreover, using the source 20 for plasma cutting yields improvements in efficiency, as well as size and cost reductions over earlier power sources.

A further advantage of the welding source 20 is the elimination of switching losses by employing the zero voltage switching scheme described above. Furthermore, drastically increasing the switching frequency to these high frequency levels, on the order of 50 kHz and above, avoids audible noise levels. Moreover, the use of this high frequency switching scheme allows a significant reduction in the size of the passive components of the power source 20, yielding the size and weight reductions described above. More uniform welding is accomplished using source 20, which provides a higher quality finished product with smoother welds than possible using earlier converters.

Conclusion

The zero-voltage switching, high frequency welding power source 20 illustrated herein offers several advantages such as size and weight reduction, efficiency improvement, fast responses, no audible noises, and no EMI problems. However, some of engineering design concerns described above may be addressed by those skilled in the art for the various implementations of a practical welding machine. For instance, for a reduction in the duty cycle, a lower switching frequency may be employed, or the transformer 100 may be designed with a reduced leakage inductance 102.

The parasitic ringing phenomenon may be addressed by including either a passive or active snubber circuit in the output rectifier 120, which is illustrated as nonpolarized snubber configuration. There are tradeoffs between employing each type of snubber. For example, a passive snubber circuit damps the high frequency ringing but dissipates energy, whereas an active snubber does not dissipate energy but increases the cost significantly. The design trade-off may be weighed based upon the engineering judgment of those skilled in the art. Overall, the disclosed high frequency power source 20 is well suited for a variety of welding applications.

Having illustrated and described the principles of my invention with respect to a preferred embodiment, it should be apparent to those skilled in the art that my invention may be modified in arrangement and detail without departing from such principles. For example, other combinations of hardware and software may be used to implement the functions of the rectifiers 30 and 120, the inverter 50 and the controller 90 described herein. Such structural equivalents for the components described above are known to be interchangeable by those skilled in the art and may be substituted herein. I claim all such modifications falling with the scope and spirit of the following claims.

I claim:

1. A welding machine power source, comprising:
    a rectifier input bridge for coupling to an AC source and supplying DC power to a positive DC bus and a negative DC bus;
    an inverter coupled to said rectifier input bridge, said inverter comprising first, second, third and fourth switch assemblies, with said first and second switch assemblies connected to said positive DC bus, and said third and fourth switch assemblies connected to said negative DC bus, said first and third switch assemblies connected in series and said second and fourth switch assemblies connected in series, each switch assembly comprising an antiparallel coupled switch and diode, each switch responsive to a gate signal, and each switch assembly having a parasitic capacitance;

a high frequency transformer coupled to said inverter, said transformer having an internal inductance selected to resonate with said parasitic capacitance for generating a period of zero voltage across each switch, said internal inductance of said transformer comprising a leakage inductance for resonating during a loaded condition, and a magnetizing inductance for resonating during a no-load condition;

a controller for generating said gate signals during said zero voltage periods, said controller generating gate signals so said first and fourth switches conduct to provide a positive voltage to said transformer, and so said second and third switches conduct to provide a negative voltage to said transformer, said positive voltage and said negative voltage forming a quasi-square wave voltage transformer input signal; and an output rectifier coupled between said transformer and a welding machine electrode, said output rectifier including a first diode in parallel with a first non-polarized snubber circuit, and a second diode in parallel with a second non-polarized snubber circuit to process said quasi-square wave voltage transformer input signal without relying upon a voltage regulation filter and to apply a DC signal to said welding machine electrode.

2. A welding machine power source according to claim 1 wherein each switch comprises an insulated gate bipolar transistor.

3. A welding machine power source according to claim 1 wherein said transformer has a secondary winding with first and second ends and a tap therebetween, with said first and second ends of said secondary winding coupled to said output rectifier, and said tap for coupling to a ground electrode.

4. A welding machine power source according to claim 1 further comprising a filter coupled between said rectifier input bridge and said inverter.

* * * * *